United States Patent
Song et al.

(10) Patent No.: US 8,953,586 B2
(45) Date of Patent: *Feb. 10, 2015

(54) METHOD FOR PLACING CALL IN VOICE CALL CONTINUITY AND TERMINAL AND SERVER THEREOF

(71) Applicant: LG Electronics Inc., Seoul (KR)

(72) Inventors: Jae-Seung Song, Seoul (KR); Kyung-Ae Yoon, Suwon (KR); Mi-Seon Ra, Seoul (KR); Hyun-Sook Kim, Seoul (KR); Patrice Hede, Enghien-les-bains (FR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/146,975

(22) Filed: Jan. 3, 2014

(65) Prior Publication Data

US 2014/0119364 A1  May 1, 2014

Related U.S. Application Data

(63) Continuation of application No. 11/702,067, filed on Feb. 5, 2007, now Pat. No. 8,638,782.

(60) Provisional application No. 60/765,214, filed on Feb. 6, 2006.

(30) Foreign Application Priority Data

Nov. 6, 2006 (KR) .................. 10-2006-0109113
Jan. 29, 2007 (KR) .................. 10-2007-0009094

(51) Int. Cl.
*H04L 12/66* (2006.01)
*H04W 4/00* (2009.01)
(Continued)

(52) U.S. Cl.
CPC .......... *H04L 45/22* (2013.01); *H04M 3/42008* (2013.01); *H04M 3/42153* (2013.01);
(Continued)

(58) Field of Classification Search
CPC . H04L 45/22; H04L 65/1083; H04L 65/4007; H04W 48/18; H04W 80/10; H04M 3/42153; H04M 7/123
USPC ........... 370/352–356, 331; 455/436–439, 442
See application file for complete search history.

(56) References Cited

U.S. PATENT DOCUMENTS

| 6,567,667 | B1 | 5/2003 | Gupta et al. |
| 7,564,840 | B2 | 7/2009 | Elliott et al. |

(Continued)

FOREIGN PATENT DOCUMENTS

| CN | 1377559 A | 10/2002 |
| JP | 4-23647 A | 1/1992 |
| JP | 10-178422 A | 6/1998 |
| JP | 2000-209633 A | 7/2000 |
| JP | 2000-261571 A | 9/2000 |
| JP | 2003-18326 A | 1/2003 |
| JP | 2003-060713 A | 2/2003 |
| JP | 2003-060807 A | 2/2003 |
| JP | 2003-92622 A | 3/2003 |
| JP | 2003-169137 A | 6/2003 |
| JP | 2003-169379 A | 6/2003 |
| JP | 2004-064208 A | 2/2004 |
| JP | 2005-295232 A | 10/2005 |
| WO | WO 01/15468 A1 | 3/2001 |
| WO | WO 2004/112416 A1 | 12/2004 |
| WO | WO 2005-079030 A1 | 8/2005 |

*Primary Examiner* — Asad Nawaz
*Assistant Examiner* — Kai Chang
(74) *Attorney, Agent, or Firm* — Birch, Stewart, Kolasch & Birch, LLP (57) ABSTRACT

A method, server and terminal for providing a Voice Call Continuity (VCC) service, are discussed. According to an embodiment, the terminal includes a storage unit to store operator policy information and user preference information, the user preference information including domain selection information specifying a user-preferred domain to be used when originating the outgoing call from the terminal, the operator policy information including domain selection information specifying a network-preferred domain to be used when originating the outgoing call from the terminal; and a controller to perform a domain selection for the outgoing call based on the user preference information or the operator policy information.

19 Claims, 9 Drawing Sheets

(51) Int. Cl.

| | | |
|---|---|---|
| *H04W 36/00* | (2009.01) | |
| *H04L 12/707* | (2013.01) | |
| *H04M 3/42* | (2006.01) | |
| *H04M 7/12* | (2006.01) | |
| *H04Q 3/00* | (2006.01) | |
| *H04W 48/18* | (2009.01) | |
| *H04L 29/06* | (2006.01) | |
| *H04W 8/18* | (2009.01) | |
| *H04W 80/10* | (2009.01) | |

(52) U.S. Cl.
CPC ............ *H04M7/123* (2013.01); *H04Q 3/0045* (2013.01); *H04W 36/0022* (2013.01); *H04W 48/18* (2013.01); *H04L 65/1016* (2013.01); *H04L 65/1043* (2013.01); *H04L 65/104* (2013.01); *H04L 65/1083* (2013.01); *H04L 65/80* (2013.01); *H04L 65/103* (2013.01); *H04L 65/4007* (2013.01); *H04W 8/18* (2013.01); *H04W 80/10* (2013.01)
USPC .......... 370/353; 370/352; 370/354; 370/355; 370/356; 370/331; 455/436; 455/437; 455/438; 455/439; 455/442

(56) References Cited

U.S. PATENT DOCUMENTS

| | | | |
|---|---|---|---|
| 7,843,904 | B2 | 11/2010 | Song et al. |
| 2003/0026245 | A1 | 2/2003 | Ejzak |
| 2003/0027595 | A1 | 2/2003 | Ejzak |
| 2005/0228847 | A1 | 10/2005 | Hayes, Jr. |
| 2005/0234967 | A1 | 10/2005 | Draluk et al. |
| 2005/0259649 | A1 | 11/2005 | Smith |
| 2006/0056448 | A1 | 3/2006 | Zaki et al. |
| 2006/0229093 | A1 | 10/2006 | Bhutiani et al. |
| 2007/0238468 | A1 | 10/2007 | Buckley et al. |
| 2008/0004007 | A1 | 1/2008 | Kallio |

BACKGROUND ART

FIG.3

BACKGROUND ART

FIG.4

BACKGROUND ART

FIG.5

BACKGROUND ART

METHOD FOR PLACING CALL IN VOICE CALL CONTINUITY AND TERMINAL AND SERVER THEREOF

This application is a continuation application of copending U.S. application Ser. No. 11/702,067 filed on Feb. 5, 2007, which relates to U.S. application Ser. No. 11/702,065 filed on Feb. 5, 2007 (now U.S. Pat. No. 7,843,904) and which claims priority under 35 U.S.C. §119(e) to U.S. Provisional Application No. 60/765,214 filed on Feb. 6, 2006 and under 35 U.S.C. §119(a) to Korean Patent Applications Nos. 10-2006-0109113 and 10-2007-0009094 filed on Nov. 6, 2006 and Jan. 29, 2007, all of which are hereby expressly incorporated by reference into the present application.

BACKGROUND OF THE INVENTION

1. Field of the Invention

The present invention relates to a Voice Call Continuity (VCC), and more particularly, to selecting, by a VCC application server or a terminal, a domain by taking into account user preferences and operator policy and placing originating and/or terminating calls over the selected domain.

2. Description of the Background Art

In general, a Voice Call Continuity (VCC) refers to a type of application, namely, a home IMS application which is capable of transporting voice calls between a CS (circuit-switched) domain and an IMS (IP multimedia subsystem) domain. The VCC (also referred to as the VCC application) provides functions of voice call originations, voice call terminations and a domain transfer from the CS domain to the IMS domain or vice versa. Here, the domain transfer refers to transferring access legs for voice calls toward a user equipment (UE) (i.e., a terminal) from the CS domain to the IMS domain or vice versa during an active session. The access leg denotes a call control leg between a VCC UE and a Domain Transfer Function (DTF) of the VCC application.

The domain transfer for a certain voice call/session from the CS domain to the IMS domain or vice versa is performed only when a DTF is positioning on a signal path of the voice call/session setup. For this, positioning of the DTF on the way of the signal path of the voice call/session setup is referred to as anchoring in IMS or anchoring.

Figure 1:
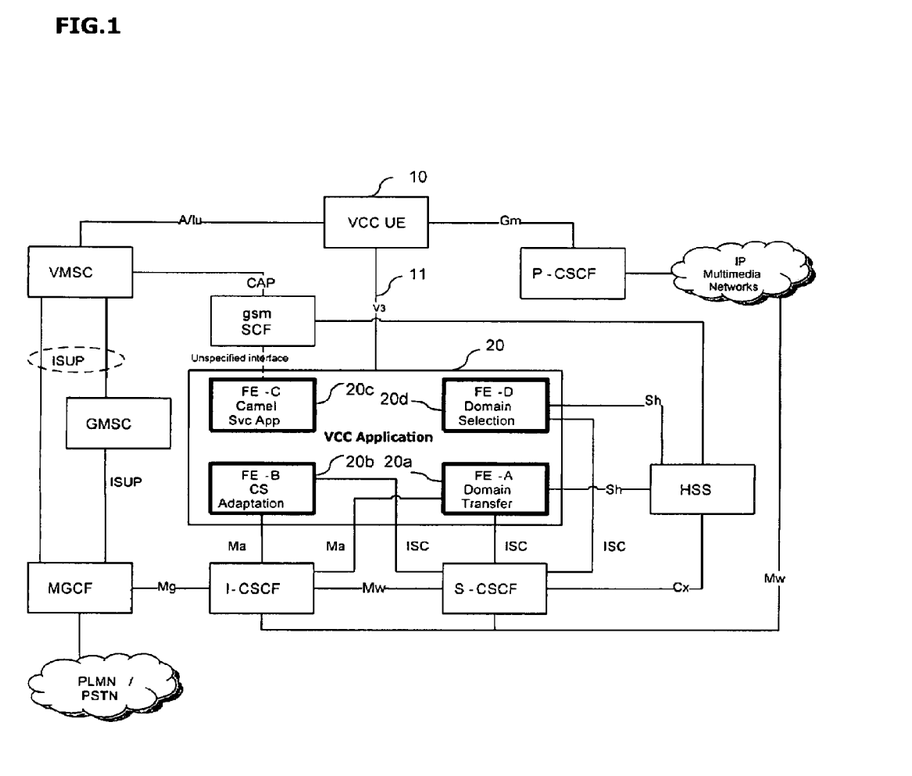
FIG. 1 is a view illustrating architecture of a network for providing a VCC service, in which the present invention can be implemented.

FIG. 1 illustrates an architecture of a network for providing a VCC service.

As illustrated in FIG. 1, a VCC UE 10 denotes any type of terminal which support the VCC service. The VCC UE can access CS and PS (packed switched) domains. That is, when accessing the CS domain, the VCC UE uses a UE-CS (not shown) provided therein, whereas a UE-IMS (not shown) provided therein is used when accessing the PS domain.

A VCC application 20 is an application server for providing the VCC service, and is constituted with entities which perform a series of functions. That is, the series of functions may include functions required to setup voice calls toward the VCC UE, and functions required to switch an access leg of the VCC UE between the CS domain and the IMS domain with maintaining an active session. Here, as shown, the series of functions can be a Domain Transfer Function 20a, a Domain Selection Function 20d, a CS Adaptation Function 20b, and a CAMEL Service Application 20c. Detailed capabilities and operations of the series of functions are described in 3GPP TS 23.206 V1.2.0.

Generally, the CS domain entities include Visited Mobile Switching Center (VMSC), Gateway MSC (GMSC), gsm-SCF, and the like. The IMS domain entities include P-CSCF, S-CSCF, I-CSCF and Media Gateway Control Function (MGCF). These are known entities.

Figure 2:
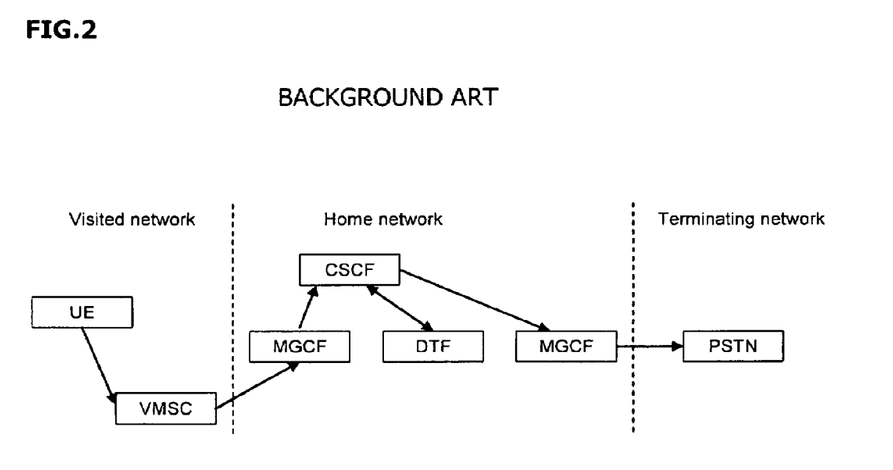
FIG. 2 is a view illustrating a signal path of an outgoing call over a CS domain in a VCC service according to the background art.
Figure 3:
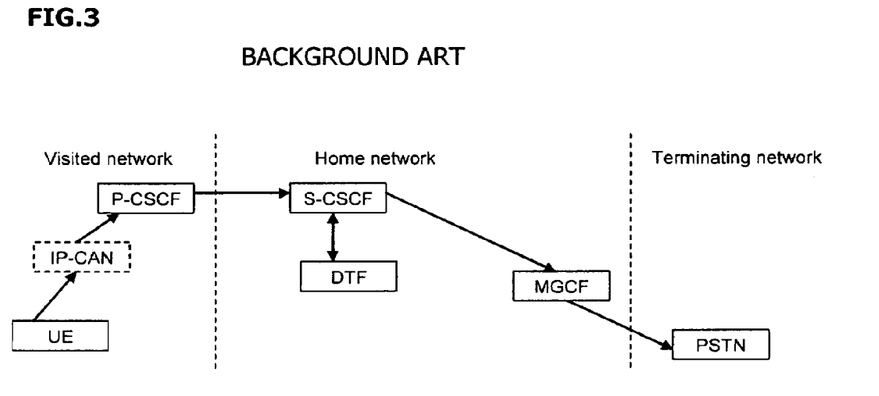
FIG. 3 is a view illustrating a signal path of an outgoing call over an IMS domain in a VCC service according to the background art.
Figure 4:
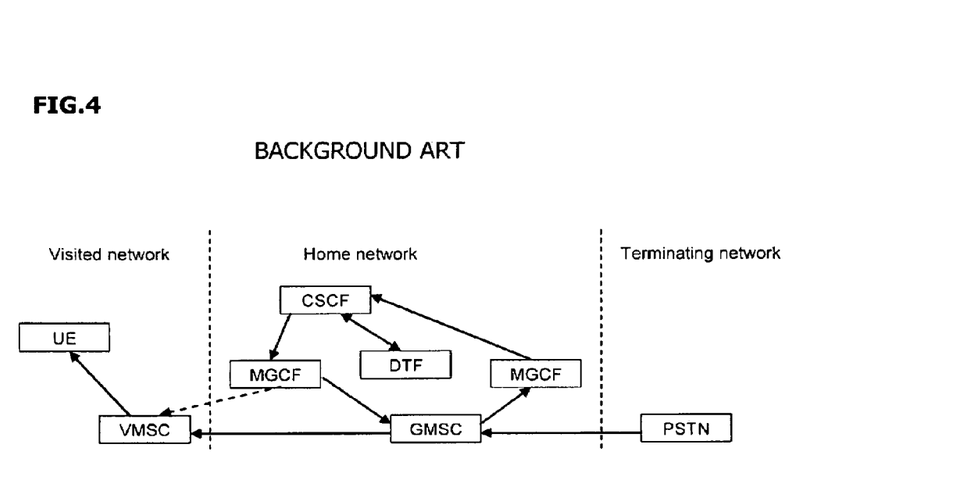
FIG. 4 is a view illustrating a signal path of an incoming call over a CS domain in a VCC service according to the background art.
Figure 5:
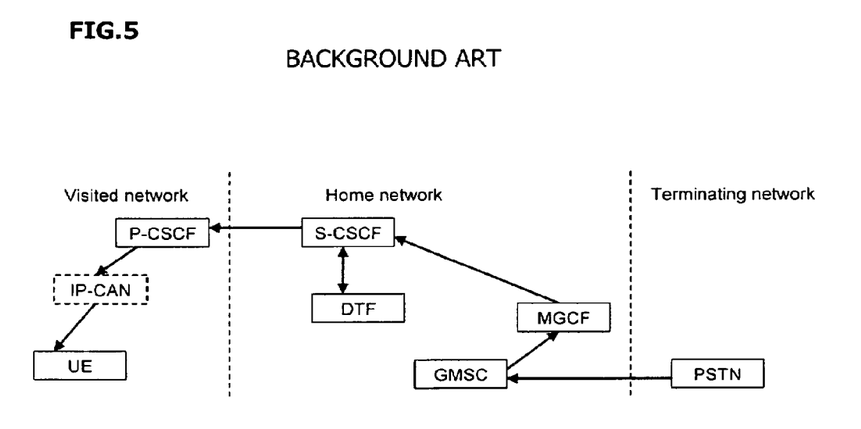
FIG. 5 is a view illustrating a signal path of an incoming call over an IMS domain in a VCC service according to the background art.

Hereinafter, a method for processing VCC call origination and VCC call termination in a VCC service will be explained with reference to FIGS. 2 through 5 according to the background art, which is implemented in the network architecture of FIG. 1. FIGS. 2 through 5 illustrate signal paths (or routing) for performing an outgoing/incoming call setup session. That is, FIGS. 2 and 3 illustrate a signal path of an originating call in the VCC service. In particular, FIG. 2 illustrates a signal path of an originating call over a CS domain in the VCC service, while FIG. 3 illustrates a signal path of an originating call over an IMS domain in the VCC service. An originating call is also known as an outgoing call, i.e., a call outgoing from the VCC UE 10 to the VCC application 20. Meanwhile, FIGS. 4 and 5 illustrate a signal path of a terminating call in the VCC service. Particularly, FIG. 4 illustrates a signal path of a terminating call over the CS domain in the VCC service, while FIG. 5 illustrates a signal path of a terminating call over the IMS domain in the VCC service. A terminating call is also known as an incoming call, i.e., a call incoming to the VCC UE 10 terminal from the VCC application 20. Here, the VCC call denotes a call which is terminated or originated by the VCC UE 10, namely, a voice call having a call continuity by being anchored in the VCC application 20 located in the home IMS domain, even while a domain is transferred from the CS domain to the IMS domain or vice versa.

It is assumed in FIGS. 2 through 5 that a user of a UE (i.e., VCC UE) is a VCC subscriber allowing for a home network thus to use the VCC service, and is currently residing in a visited network.

Hereinafter, a signal path of outgoing calls over a CS domain will be explained with reference to FIG. 2 according to the background art.

When a VCC subscriber attempts to place a CS call, the UE which is currently residing in the visited network executes a CS call setup by the VMSC on the CS domain. The CS call is transported over to a Domain Transfer Function (DTF) in the IMS domain of the home network, where it is anchored in the IMS. Next, the session (i.e., the call) corresponding to this is transported over to PSTN, for example, which is a terminating network. Afterwards, normal IMS terminating procedures take place.

Hereinafter, a signal path of outgoing calls over an IMS domain will be explained with reference to FIG. 3 according to the background art.

When a VCC subscriber attempts to place an IMS call, the UE which is currently residing in the visited network executes an IMS call setup on the IMS domain. The IMS call is transported over to P-CSCF via IP-CAN. Afterwards, the IMS call is transported over to the DTF in the IMS domain of a home network, and then transported over to PSTN in a terminating network. Afterwards, normal IMS terminating procedures take place.

Hereinafter, a signal path of incoming calls over a CS domain will be explained with reference to FIG. 4 according to the background art.

When an originating party (or A-party) attempts to place a call to a terminating party (or B-party), the originating party originates a call which reaches a Gateway MSC (GMSC). If the B-party is recognized as a VCC subscriber in the home network, the call is routed to a DTF in the IMS domain. From the DTF, if the call is to be placed over the CS domain, the call is routed back to the CS domain via GMSC, namely, to the VMSC in the visited network. Here, all calls originating from the PSTN to the CS domain are routed to the IMS domain which is thusly anchored in the DTF.

Hereinafter, a signal path of incoming calls over an IMS domain will be explained with reference to FIG. 5 according to the background art.

If an incoming call could be placed to the UE over the IMS domain, the call anchored in the DTF proceeds over to a terminating terminal, namely, to an IMS URI of the UE via the P-CSCF and the IP-CAN of the visited network. That is, the call undergone the same anchoring procedure as illustrated in FIG. 4 is terminated in the IMS domain of the visited network.

Thus, as illustrated in FIGS. 2 and 3, when the UE originates a call (i.e., the call is an outgoing call), the user of the UE (i.e., the VCC subscriber) selects a certain domain (i.e., IMS domain or CS domain) that he prefers to use without taking operator policy into account, and directs the call to the selected domain. Therefore, the background art has technical limitations in that the UE selects a domain without taking the operator policy into account, and directs the call to the selected domain. Here, the operator policy includes information related to the domain selection for calls depending on a current state of a network (e.g., a state regarding resource allocation or traffic, etc.).

Furthermore, as illustrated in FIGS. 4 and 5, the UE can not receive an incoming call over a domain (i.e., IMS domain or CS domain) that he prefers to use. In other words, in the background art, when selecting a domain for an incoming call, a network (i.e., CCCF in detail) selects the domain for an incoming call toward the UE based upon the operator policy without taking into account the UE user's preferences with respect to selecting the domain. Accordingly, the background art contains a technical problem/limitation in that the UE user' preference of a domain selection cannot be or is not taken into account by the VCC application when the VCC application selects a domain in the domain selection process for the incoming call toward the UE.

Therefore, as aforementioned, from the UE perspective, since the UE selects a domain without considering the operator policy which could be changed (or updated) due to, for example, a network state or traffic, etc., there occurs a call inconsistency caused by the traffic of a certain domain (IMS or CS) generated over a network or a lack of resources allocated for a certain domain, or a frequent domain transfer.

Furthermore, from the network perspective, the network (e.g., CCCF) selects a domain without taking into account the user's preferences for selecting a domain of an outgoing call. Accordingly, a call inconsistency occurs or unnecessary domain transfers may be triggered frequently, in case the UE has a mechanical problem or the UE can not be connected to a certain domain.

In addition, the UE user can register or update user preferences through web pages other than the UE. In this case, if the updated preferences are not notified to the network or UE, the domain may incorrectly be selected, which results in a malfunction of the UE.

SUMMARY OF THE INVENTION

Therefore, it is an object of the present invention to provide a UE that sets or updates in a network (i.e., a VCC application) user preferences (which includes domain selection information) with respect to incoming calls and accordingly calls can be placed by taking the user preferences into account when the network selects a domain for the incoming calls.

It is another object of the present invention to provide a method and terminal for selecting a domain of outgoing calls by taking into account operator policy of a network when originating outgoing calls by a UE, the operator policy including domain selection information indicating a network-preferred domain to be selected.

Another object of the present invention is to provide a method of considering one of operator policy information indicating a network-preferred domain and user preference information indicating a user-preferred domain when selecting a domain for an incoming or outgoing call by a terminal or a network server such as a VCC application server.

Another object of the present invention is to provide a method of providing domain selection information, which has higher priority between the operator policy information and the user preference information, and selecting a domain for an incoming or outgoing call using the domain selection information which has higher priority between them.

Another object of the present invention is to provide a method, terminal and server for providing a VCC service, which address the limitations and disadvantages associated with the background art.

To achieve these and other objects, there is provided according to an embodiment a method for placing a call in a VCC comprising: receiving, by a terminal, domain selection information related to an outgoing call from a VCC application; and selecting, by the terminal, a domain for the outgoing call based upon the domain selection information or another domain selection information already stored in the terminal, and originating, by the terminal, the outgoing call over the selected domain.

According to another embodiment of the present invention, a method for placing a call in a VCC comprises: receiving, by a VCC application, domain selection information related to an incoming call from a terminal; and selecting, by the VCC application, a domain for the incoming call based upon the domain selection information or another domain selection information already stored in the VCC application, and allowing, by the VCC application, the incoming call to be terminated by the terminal over the selected domain.

To achieve these and other objects, there is provided according to an embodiment a terminal in a VCC comprising: a receiver for receiving domain selection information related to outgoing calls from a VCC application; a controller for selecting a domain of the outgoing calls based upon the domain selection information; and a transmitter for transmitting (originating) the outgoing calls over the selected domain.

According to another embodiment of the present invention, a terminal in a VCC comprises: a transmitter for transmitting domain selection information related to incoming calls to a VCC application; and a receiver for receiving (terminating) incoming calls over a domain which the VCC application has selected based upon the domain selection information.

To achieve these and other objects, there is provided according to an embodiment an application server in a VCC performs: receiving domain selection information related to an incoming call from a terminal; selecting a domain based upon the domain selection information related to the incoming call to place the incoming call to the terminal over the selected domain; transmitting domain selection information related to an outgoing call to the terminal; and receiving the outgoing call from the terminal over a domain selected based upon the domain selection information related to an outgoing call.

According to one aspect, the present invention provides a method for providing an incoming call directed to a terminal in a voice call continuity (VCC) service, the method comprising: receiving, by the VCC application server, user preferences information from the terminal for storage in the VCC application server; storing, in a VCC application server, the received user preferences information; performing, by the VCC application server, a domain selection for the incoming call based on the user preferences information or operator policy information; and transmitting, by the VCC application server, the incoming call over the selected domain selection.

According to another aspect, the present invention provides a method for providing an outgoing call originating from a terminal subscribed to a voice call continuity (VCC) service, the method comprising: receiving, by the terminal, operator policy information from the VCC application server for storage in the terminal; storing, in the terminal, the operator policy information received from the VCC application server; performing, by the VCC application server, a domain selection for the outgoing call based on the operator policy information or user preferences information; and transmitting, by the terminal, the outgoing call over the selected domain selection.

According to another aspect, the present invention provides a device for providing service continuity and selecting a domain for an incoming call directed to a terminal in the service, the device comprising: a storage unit to store therein operator policy information and user preference information, the user preference information including domain selection information specifying a user-preferred domain to be used when transmitting the incoming call to the terminal, the operator policy information including domain selection information specifying a network-preferred domain to be used when transmitting the incoming call to the terminal; and a domain selection function unit to perform a domain selection for the incoming call based on the user preference information or the operator policy information.

According to another aspect, the present invention provides a terminal for providing service continuity and selecting a domain for an outgoing call originating from the terminal in the service, the terminal comprising: a storage unit to store operator policy information and user preference information, the user preference information including domain selection information specifying a user-preferred domain to be used when originating the outgoing call from the terminal, the operator policy information including domain selection information specifying a network-preferred domain to be used when originating the outgoing call from the terminal; and a controller to perform a domain selection for the outgoing call based on the user preference information or the operator policy information.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE PREFERRED EMBODIMENTS

The present invention is applicable to a Voice Call Continuity (VCC) field of 3GPP, and it may also be applicable to other communication fields.

The present invention conceptually is related to selecting a domain of an ongoing call base on user preferences (referred to as 'first Domain Selection Information') or operator policy (referred to as 'second Domain Selection Information') in case of transferring a domain of the ongoing call from CS domain to IMS domain or vice versa. The present invention may provide preferred embodiments for incoming call and outgoing call as follows.

The present invention conceptually is related to, first, setting or updating, by a UE, so-called domain selection information related to selecting a domain in a corresponding entity of a network, whereby an incoming call toward the UE can be placed over a domain desired by a UE user. The incoming call toward the UE is placed toward the UE based upon the set or updated domain selection information. Especially, the domain selection information can be set or updated in a certain entity (e.g., a VCC application) of the network through the UE handled by the UE user or through a web page which the UE user accesses using any other terminal (e.g., PCs or PDAs). Also, when a network server selects a domain for an incoming call, a domain for the incoming call may be selected using one of the user preferences and operator policy. Here, depending on information related to predefined network management policy, predefined rules (or policy), information preset by a user and etc., it may be defined (or set) such that one of the user preferences and the operator policy may have higher priority than the other. Based on the domain selection information (i.e., the user preferences or the operator policy) having precedence, a domain for the incoming call may be selected. Further the second domain selection information may include 'precedence information' indicating which one of the first domain selection information (user preferences) and the second domain selection information (operator policy) has higher priority (or precedence) than the other. Here, the precedence information, which indicates which domain selection information should be used among the first domain selection information (the user preferences) the second domain selection information (the operator policy).

Second, when placing an outgoing call originated by the UE, the UE receives and stores the set or updated domain selection information notified by a certain entity (e.g., a VCC application) of a network. Afterwards, the UE selects a domain (e.g., IMS domain or CS domain) for an outgoing call based upon the stored domain selection information to place the call over the selected domain. Here, the domain selection information is set or updated by being included in operator policy, and such operator policy information can be transmitted from the network entity such as the VCC application to the UE. Also, when a network server selects a domain for an outgoing call, a domain for the outgoing call may be selected using one of the user preferences and operator policy. Here, depending on information related to predefined network management policy, predefined rules (or policy), information preset by a user and etc., it may be defined (or set) such that one of the user preferences and the operator policy may have higher priority than the other. Based on the domain selection information (i.e., the user preferences or the operator policy) having higher priority, a domain for the outgoing call may be selected. Further, the second domain selection information may include 'precedence information' indicating which one of the first domain selection information (user preferences) and the second domain selection information (operator policy) has higher priority (or precedence) than the other. Here, the precedence information indicates which domain selection information should be used between the first domain selection information (the user preferences) and the second domain selection information (the operator policy).

Hereinafter, terms used or to be used in the description of the present invention will now be generally defined.

An UE according to the present invention may include all types of terminals which can be used for the VCC service. For instance, the UE according to the present invention comprehensively includes mobile communications terminals (e.g., UEs, mobile phones, cellular phones, DMB phones, DVB-H phones, PDAs, PTT, etc.), digital TV sets, GPS navigation, portable game machines, MP3, other home appliances, and the like.

User preferences, first domain selection information, generally denote information (or parameter) for defining domain selection information which indicates what domain the UE user prefers to use for incoming or outgoing calls when the UE (or terminal) is available over both the CS domain and IMS domain. The user can set priority (i.e., preference) of a domain (e.g., IMS domain or CS domain) preferred to be used for the outgoing or incoming calls and stores it in the UE. The UE accordingly can select the domain for the outgoing calls based upon the stored priority (i.e., user preference). If the UE user, on the other hand, has registered (or updated) user preferences in a certain entity (e.g., VCC application) of a network by use of the UE (or any other terminal), a domain (i.e., IMS domain or CS domain) for incoming calls can be selected according to the registered user preferences. Conversely, the user preferences for incoming calls toward the UE can be set by the UE, information of which is transmitted to a certain entity (e.g., VCC application) of the network to be then stored. The user preferences can include other information in addition to the user-preferred domain selection information. The user preference can be transmitted from the UE to the VCC application (network server) via a V3 interface (11 in FIG. 1) such as a Ut interface which is a direct communication interface between the VCC application and the UE. The V3 interface and the Ut interface are known in the art. Operator policy generally means information related to domain selection as well as policy (or information) related management and maintenance on a network and/or a system, second domain selection information. However, operator policy, second domain selection information, denotes information (or parameter) for defining just domain selection information which indicates which domain is required (or preferred) by an operator to use for incoming calls or outgoing calls when the UE (or the terminal) is available over both the CS domain and IMS domain. The operator policy can be applied to both the outgoing calls and incoming calls. For example, the incoming and/or outgoing calls can be routed to the CS domain or IMS domain based upon the operator policy. Alternatively, the operator policy may not have any information regarding the incoming and/or outgoing calls. Also, priorities for a user's preferred domain of incoming and/or outgoing calls (e.g., 1. IMS over I-RLAN; 2. CS; 3. IMS over PS; etc.) may be listed based upon the operator policy. The incoming and/or outgoing calls can be routed to the CS domain or IMS domain based upon the list of priorities. Operator policy including the network-preferred domain selection information can be provided to the UE from the network entity such as the VCC application through a V3 interface using a Device Management (DM), Client Provisioning (CP) or Factory Provisioning (FP), etc. The DM, CP, and FP are known in the art. For instance, each of the UE and the VCC application can include a DMA unit to provide the DM function. Also, the operator policy for incoming calls can be set and stored by the network and then transmitted to the VCC application.

Hereinafter, construction and operations of the present invention will be explained in detail with reference to FIGS. 6 through 9.

Figure 6:
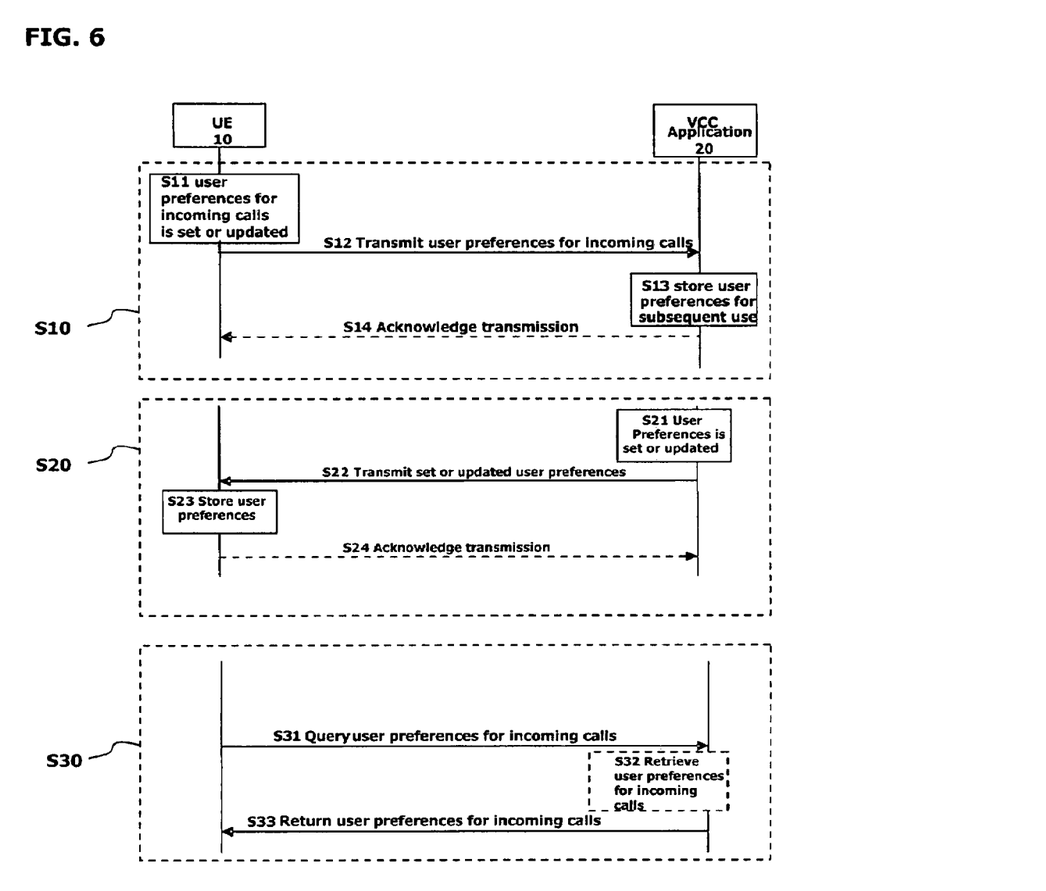
FIG. 6 is a signal flowchart illustrating different methods for storing user preferences in a network in accordance with one embodiment of the present invention.

FIG. 6 is a signal flowchart illustrating three different examples of storing user preferences in a network such that the network entity such as the VCC application 20 can select a domain for incoming calls based upon the user preferences, depending on the precedence information, in accordance with one embodiment of the present invention.

More particularly, in FIG. 6, the first example is illustrated through a series of steps (S10), the second example is illustrated through a series of steps (S20), and the third example is illustrated through a series of steps (S30). The three examples in FIG. 6 are classified according to a subject by which user preferences are stored in a certain entity of a network. The steps S10, S20 and S30 are mutually independent without any relation to one another, and the receiving step S2 of FIG. 6 can incorporate any of these steps S10, S20 and S30.

In the first example in FIG. 6, the series of steps (S10) is a signal flowchart illustrating that a UE user sets or updates user preferences (including the user-preferred domain selection information indicating the user's preferred domain) and transmits the set or updated user preferences to a VCC application of a network.

Hereinafter, the series of steps (S10) as the first example in FIG. 6 will be explained.

As shown in FIG. 6, a UE user sets or updates user preferences to include domain selection information for indicating a domain preferred by the user, e.g., for incoming calls toward the UE 10 (S11). Here, the UE user may query the current user's preferences from the VCC application 20 before step S11.

The UE 10 then transmits the user preferences including the user-preferred domain selection information to the VCC application 20 (S12). This can be made by using a V3 interface such as a Ut interface between the UE 10 and the VCC application 20. Each of the UE 10 and the VCC application 20 may include a Ut interface unit to provide the Ut interface.

The VCC application 20 stores the received user preferences in an internal memory or in a remote entity (e.g., HSS (home subscriber server) of a home network) (S13). As an example, If the user preferences is preset to have higher priority than the operator policy, the VCC application 20 can make a domain selection for incoming calls by using the user preferences when selecting the domain for the incoming calls toward the UE 10. On the other hand, if the operator policy is preset to have higher priority than the user preferences, the VCC application 20 can make a domain selection for incoming calls by using the operator policy when selecting the domain for the incoming calls toward the UE 10.

The VCC application 20 can optionally transmit a response message (e.g., an ACK message) with respect to step S12 (S14). The response message (e.g., the ACK message) in step S14 can be transmitted before or after step S13, and is an optional step.

Hereinafter, the series of steps S20 as the second example in FIG. 6 will be explained.

In the second example, a user (i.e. a VCC subscriber) sends the user preferences including the user-preferred domain selection information to the VCC application 10 through any other wired/wireless communication device such as PCs or PDAs other than the UE 10, and sets or updates previous user preferences in the VCC application 20 (S21). For example, the user can access the VCC application 20 via the wired/wireless communication device such as the PC to update or set the user preferences, e.g., to update or set the user-preferred domain selection information. Alternatively, the user can access a webpage which is interworked with the VCC application 20 via any other wired/wireless communication device other than the UE so as to update or set the user preferences. Here, the communication device (e.g., PC) and the VCC application 20 may be connected to each other via a Ut interface or VCC UE-VCC application interface or any other interface. At step S21, the user preferences can be obtained from the VCC application itself or from an external device.

Then the VCC application 20 transmits the set or updated user preferences including the user-preferred domain selection information to the UE 10 (S22). The UE 10 then stores the received user preferences in a certain memory provided in the UE (S23).

The UE 10 may optionally transmit a response message (e.g., an ACK message) in response to step S22 (S24). The response message (e.g., the ACK message) in step S24 may be transmitted before or after step S23, and is an optional step.

Accordingly, in the second example of FIG. 6, the VCC application 20 selects a domain for incoming calls based upon the user preferences stored therein (e.g., user preferences that the user stores by use of any other wired/wireless communication device other than the UE) or the operator policy, depending on the precedence information. The UE, on the other hand, selects a domain for outgoing calls based on the user preferences stored in step S23 or the operator policy, depending on the precedence information.

Hereinafter, the series of steps S30 as the third example in FIG. 6 will be explained.

This example illustrates that the UE queries the user preferences that the VCC application has (stores). The UE queries the user preferences for incoming calls from the VCC application 20 (S31).

The VCC application 20 retrieves the user preferences (including the user-preferred domain selection information) which have previously been stored in an internal entity or a remote or external entity (S32). Here, the internal entity can be one of the Domain Transfer Function 20*a*, the CS Adaptation Function 20*b*, the CAMEL Service Application 20*c*, and the Domain Selection Function 20*d* of the VCC application 20, or any other VCC element. The VCC application 20 uses the user preferences or the operator policy to perform a domain selection for an incoming call, depending on the precedence information as discussed above. The VCC application 20 returns the retrieved user preferences to the UE (S33).

Figure 7:
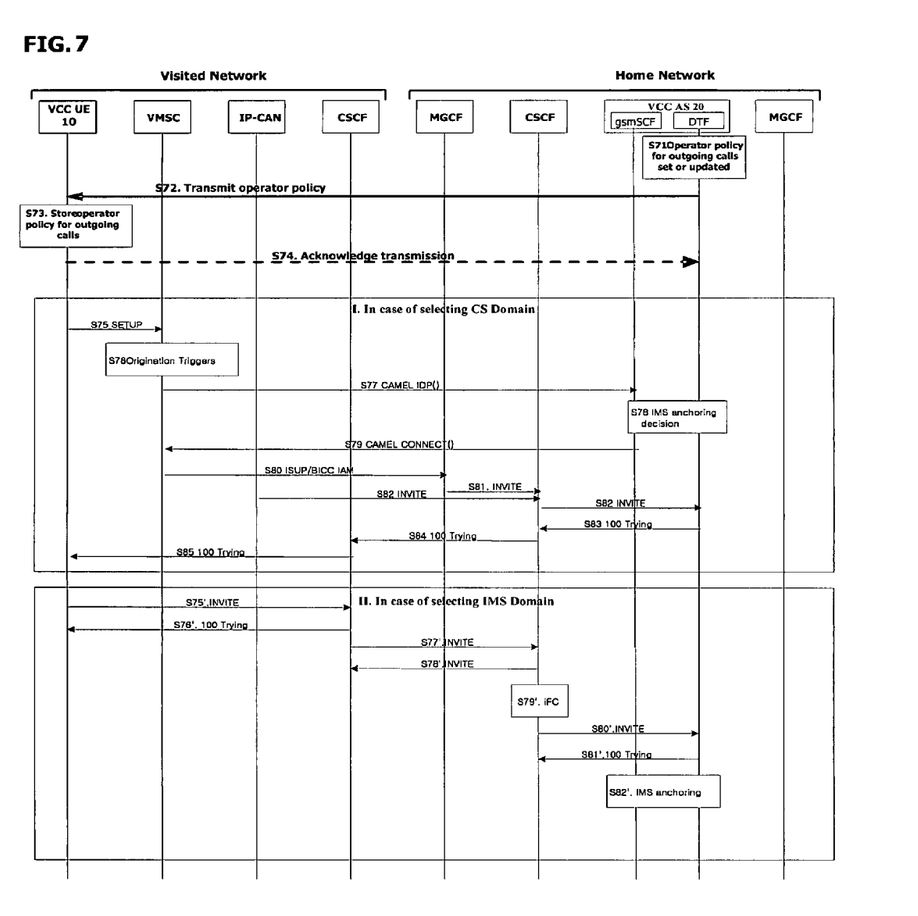
FIG. 7 is a signal flowchart illustrating a method for transmitting operator policy for outgoing calls to a UE in accordance with one embodiment of the present invention.

As aforementioned, in the first to third examples illustrated in FIG. 6, when the VCC application 20 selects a domain for incoming calls, or when the UE selects a domain for outgoing calls, the VCC application 20 or the UE 10 can take into account the user preferences including the user-preferred domain selection information or the operator policy including the network-preferred domain selection information, depending on the precedence information. FIG. 7 is a signal flowchart illustrating, as an example, a procedure of transmitting operator policy for outgoing calls from a network server to a UE in accordance with one embodiment of the present invention. The procedure (steps S71, S72 and S73) of FIG. 7 can be used in the receiving step S2 of FIG. 6, whereby the UE receives the operator policy from the VCC application.

Referring to FIG. 7, operator policy for outgoing calls is set or updated in the VCC application 20 (S71). This operator policy includes the network-preferred domain selection information, and can include other information, e.g., the precedence information. The VCC application 20 then transmits the set or updated operator policy to the UE 10, e.g., via a V3 interface such as using a DM method (S72).

The UE 10 then stores the received operator policy for the outgoing calls in a certain memory or storage unit (S73). The UE 10 then transmits a response message (e.g., an ACK message) to the VCC application 20 in response to step S72 (S74). Here, the response message (i.e., the ACK message) in step S74 may be transmitted before or after step S73, and can be an optional step.

After steps S71 to S74 performed, for placing an outgoing call, the UE 10 can then take into account the set or updated operator policy or the user preferences stored in UE, to select a domain for the outgoing call, and then places the outgoing call over the selected domain (e.g., CS domain or IMS domain). That is, the UE 10 may determine (or check, or detect) which domain selection information has been preset to get higher priority between the user preference (i.e., first domain selection information) and the operator policy (i.e., second domain selection information). Next, using the determined domain selection information (i.e., the user preference or the operator policy), the UE 10 makes domain selection and places the outgoing call over the selected domain (e.g., CS domain or IMS domain). As an example, if the operator policy is preset to have higher priority than the user preferences, the UE 10 can make a domain selection for outgoing calls by using (or referring, or retrieving) the operator policy when selecting the domain for the outgoing calls toward the VCC application 20. On the other hand, if the user preferences is preset to have higher priority than the operator policy, the UE 10 can make a domain selection for outgoing calls by using (or referring, or retrieving) the user preferences when selecting the domain for the outgoing calls toward the VCC application 20. Only as an example, as illustrated in FIG. 7, the outgoing call over the CS domain can be placed according to the series of steps in FIG. 7 (i.e., S75 to S85), or the outgoing call over the IMS domain can be placed according to the series of steps in FIG. 7 (i.e., S75' to S82'). The processes of placing a call over the CS domain or the IMS domain as indicated in steps S75 to S85 and steps S75' to S82', once the domain selection has been according to the present invention, are known and thus are not further discussed.

Figure 8:
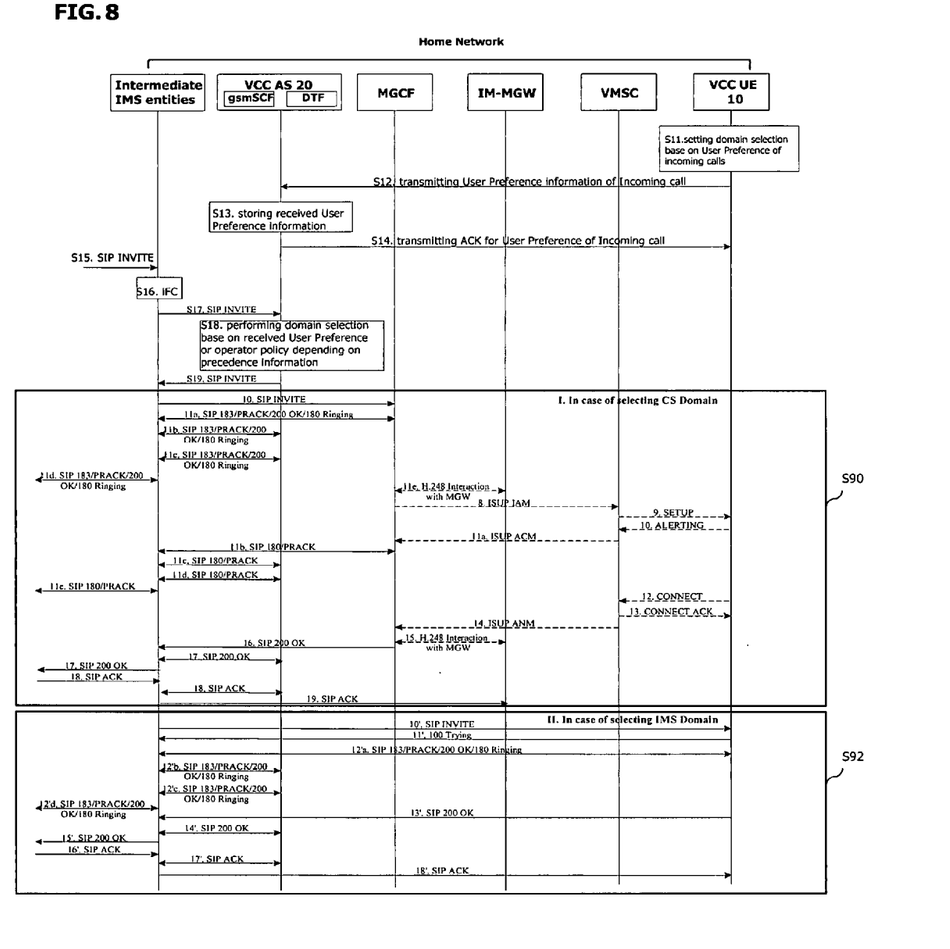
FIG. 8 is a signal flowchart illustrating a procedure of placing incoming calls after selecting a domain in accordance with one embodiment of the present invention.

FIG. 8 is a signal flowchart illustrating, as an example, a procedure of placing an incoming call after selecting a domain by taking user preferences or operator policy into account, depending on precedence information in accordance with one embodiment of the present invention.

As illustrated in FIG. 8, a series of steps (i.e., S11 to S14 in FIG. 8) for transmitting by a UE the user preferences including the user-preferred domain selection information for incoming calls, to a VCC application are the same as the series of steps in FIG. 6 (S11 to S14). Therefore, the detailed explanation of the series of steps in FIG. 6 (i.e., S11 to S14) can be equally applied to the series of steps in FIG. 8 (i.e., S11 to S14).

After completing steps S11 to S14, a series of steps (S15 to S19) are executed when an incoming call is routed to the home network. When a call is requested (e.g., steps S15-S17), the VCC application 20 selects a domain (e.g., either the CS domain or the IMS domain) for the incoming call by taking the user preferences (including the user-preferred domain selection information) or the operator policy (including the network-preferred domain selection information) into account (S18). As an example, if the operator policy is preset to have higher priority than the user preferences, the VCC application 20 can make a domain selection for incoming calls by using (or referring, or retrieving) the operator policy when selecting the domain for the incoming calls toward the UE 10. On the other hand, if the user preferences is preset to have higher priority than the operator policy, the VCC application 20 can make a domain selection for incoming calls by using (or referring, or retrieving) the user preferences when selecting the domain for the incoming calls toward the UE 10. Also, the domain selection for incoming calls can be executed by the DSF of the VCC application 20.

Once the domain has been selected, the VCC application 20 transmits the incoming call over the selected domain using known techniques. For instance, if the CS domain is selected, the incoming call over the CS domain is placed according to the series of sub-steps 10-19 of step S90 in FIG. 8. If the IMS domain is selected, the incoming call over the IMS domain is placed according to the series of sub-steps 10'-18' of step S92 in FIG. 8.

Hereinafter, constructions and operations of the UE (i.e., terminal) and the VCC application according to the present invention will now be explained.

The UE and the VCC application according to the present invention may basically include hardware construction which is required for intercommunications in order to set or update user preferences and operator policy.

Figure 9:
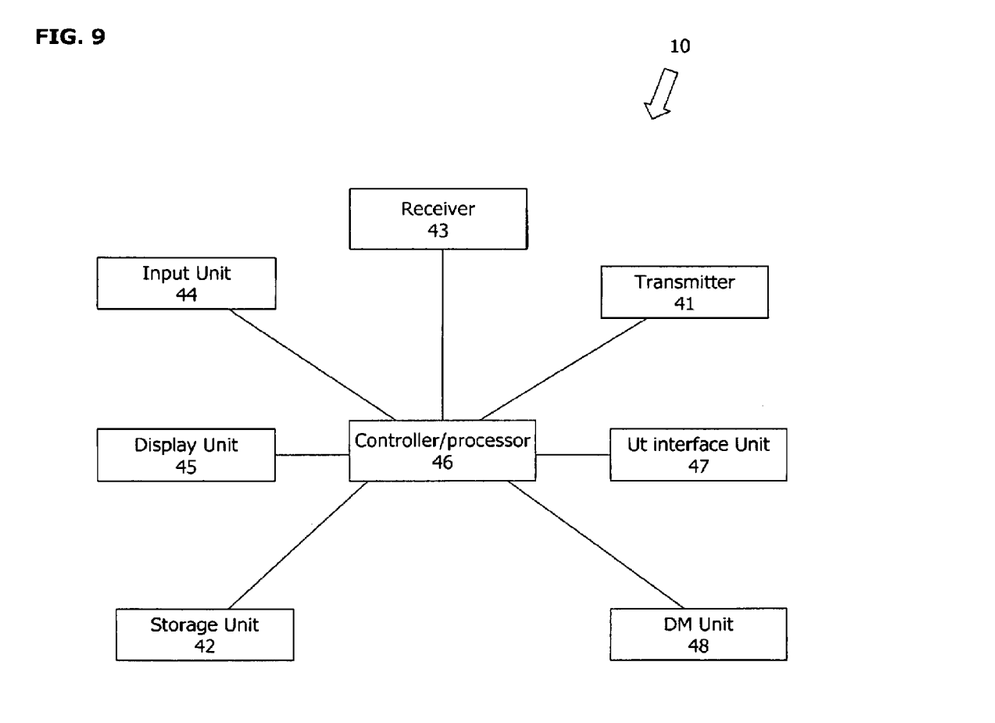
FIG. 9 is a block diagram of a terminal in which the present invention is implemented.

For instance, as shown in FIG. 9, the UE 10 according to an embodiment of the present invention may comprise a transmitter 41 for transmitting the domain selection information related to incoming calls, namely, the user preferences to a VCC application, a memory or storage unit 42 for storing the user preferences, the operator policy received from the VCC application, and other information, a receiver 43 for receiving (terminating) incoming calls which the VCC application transmits by taking the user preferences or operator policy into account, an input unit 44 for receiving a user's input such as a user's preferences, a display unit 45 for displaying information, menus, etc., and a controller/processor 46 for controlling these components. The UE may also include other known components such as a Ut interface unit 47, a DM unit 48, etc. The controller 46 can determine which domain selection information of user preferences and operator policy to select domain of ongoing calls, by checking (detecting) which one of user preferences and operator policy is preset to have higher priority than the other.

Also, the UE according to an embodiment of the present invention may comprise the receiver 43 for receiving the operator policy from the VCC application, a selection unit for selecting a domain for outgoing calls based upon the operator policy or the user preferences, and the transmitter 41 for transmitting (originating) the outgoing calls over the selected domain. Here, the selection unit can be the controller 46 which can be a type of controller for selecting the domain for the outgoing calls. As aforementioned, operations and functions of each component of the UE including technical characteristics of the present invention have been explained. Besides, components of the UE which are basically required to receive the VCC service can be obvious to those skilled in the art, explanation of which will thusly not be repeated.

As described above, for incoming calls in the present invention, since a network (i.e., VCC application) can recognize information related to selecting a domain that a UE user prefers to use based upon user preferences, the network can effectively place incoming calls over the domain which can be selected by taking into account the current communication circumstances of the UE.

Also, for outgoing calls in the present invention, since the UE can recognize domain selection information based upon operator policy, the information on the current communication circumstances of the network can be taken into account when the UE selects a domain for the outgoing call.

In addition, as described above, since the user preferences or the operator policy are taken into account to select a domain and incoming and/or outgoing calls are placed over the selected domain, calls can effectively be placed in a VCC which takes into account the current communication circumstances of the UE and/or network. Therefore, the present invention effectively prevents a frequent domain transfer, which may unnecessarily be caused by placing calls in a VCC without taking into account the current communication circumstances of the UE and network, a lack of resources or a call inconsistency.

The present invention has been explained with reference to embodiments illustrated in the drawings, which, however, are just exemplary. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. A method for providing an incoming call directed to a terminal in a voice call continuity (VCC) service, the method comprising:

performing, by a VCC application server, a domain selection for the incoming call based on either first domain selection information or second domain selection information depending on which domain selection information has a relatively higher priority, wherein the first domain selection information is user preferences, the user preferences including domain selection information specifying a user-preferred domain to be used when transmitting the incoming call to the terminal, and wherein the second domain selection information is operator policy, the operator policy including domain selection information specifying an operator-preferred domain to be used when transmitting the incoming call to the terminal; and transmitting, by the VCC application server, the incoming call over the selected domain, wherein if the first domain selection information has a higher priority than the second domain selection information, the performing step includes: selecting, by the VCC application server, either a circuit-switched (CS) domain or an IP multimedia subsystem (IMS) domain for the incoming call based on the first domain selection information, or wherein if the second domain selection information has a higher priority than the first domain selection information, the performing step includes: selecting, by the VCC application server, either the circuit-switched (CS) domain or the IP multimedia subsystem (IMS) domain for the incoming call based on the second domain selection information.

2. The method of claim 1, further comprising:
receiving, by the VCC application server, the first domain selection information from the terminal for storage in the VCC application server and storing, in the VCC application server, the received first domain selection information.

3. The method of claim 1, wherein the performing step is implemented by a Domain Selection Function of the VCC application server.

4. The method of claim 1, wherein the first domain selection information received by the VCC application server is initially input by a user at the terminal side.

5. The method of claim 1, further comprising:
setting, by a user, the first domain selection information in the VCC application server, by using a device other than the terminal, for storage in the VCC application server.

6. The method of claim 5, further comprising:
transmitting the first domain selection information from the VCC application server to the terminal for storage in the terminal.

7. The method of claim 1, further comprising:
receiving, by the VCC application server, a query regarding a user's preference of a domain from the terminal; and
retrieving, by the VCC application server, the first domain selection information for storage in the VCC application server in response to the received query.

8. The method of claim 7, further comprising:
transmitting the retrieved first domain selection information from the VCC application server to the terminal for storage in the terminal.

9. A method for providing an outgoing call originating from a terminal subscribed to a voice call continuity (VCC) service, the method comprising:
performing, by the terminal, a domain selection for the outgoing call originating from the terminal based on first domain selection information or second domain selection information, wherein the first domain selection information is user preferences and the second domain selection information is operator policy; and
transmitting, by the terminal, the outgoing call over the selected domain,
wherein the performing step includes: selecting, by the terminal, either a circuit-switched (CS) domain or an IP multimedia subsystem (IMS) domain for the outgoing call based on either the first domain selection information or the second domain selection information depending on which domain selection information has a relatively higher priority,
wherein if the first domain selection information has a higher priority than the second domain selection information, the performing step includes: selecting, by the terminal, either the circuit-switched (CS) domain or the IP multimedia subsystem (IMS) domain for the outgoing call based on the first domain selection information, or wherein if the second domain selection information has a higher priority than the first domain selection information, the performing step includes: selecting, by the terminal, either the circuit-switched (CS) domain or the IP multimedia subsystem (IMS) domain for the outgoing call based on the second domain selection information.

10. The method of claim 9, further comprising:
receiving, by the terminal, the second domain selection information, for the outgoing call originating from the terminal, from a VCC application server for storage in the terminal, wherein the terminal supports voice call continuity (VCC) that is a home Internet Protocol multimedia subsystem (IMS) application capable of transporting voice calls between the circuit-switched (CS) domain and the IP multimedia subsystem (IMS) domain.

11. The method of claim 9, further comprising:
storing, in the terminal, the second domain selection information received from a VCC application server.

12. The method of claim 9, wherein the user preferences include domain selection information specifying a user-preferred domain to be used when transmitting the outgoing call from the terminal, and the operator policy includes domain selection information specifying a operator-preferred domain to be used when transmitting the outgoing call from the terminal.

13. The method of claim 9, further comprising transmitting, by the terminal, an ACK message to a VCC application server after receiving, by the terminal, the second domain selection information from the VCC application server.

14. A device for providing service continuity and selecting a domain for an incoming call directed to a terminal in the service, the device comprising:
a storage unit to store therein operator policy information and user preference information, the user preference information including domain selection information specifying a user-preferred domain to be used when transmitting the incoming call to the terminal, the operator policy information including domain selection information specifying a operator-preferred domain to be used when transmitting the incoming call to the terminal;
a domain selection function unit to perform a domain selection for the incoming call based on the user preference information or the operator policy information; and
a Device Management (DM) unit to transmit the user preference information including the set domain selection information from the device to the terminal for storage in the terminal,
wherein the domain selection function unit selects either a circuit-switched (CS) domain or an IP multimedia subsystem (IMS) domain for the incoming call based on the domain selection information of the user preference information, if the user preference information has a higher priority than the operator policy information, or
wherein the domain selection function unit selects either the circuit-switched (CS) domain or the IP multimedia subsystem (IMS) domain for the incoming call based on the domain selection information of the operator policy information, if the operator policy information has a higher priority than the user preference information.

15. The device of claim 14, further comprising:
a Ut interface unit to receive from the terminal the user preference information including the domain selection information set by a user, for storage in the storage unit.

16. The device of claim 14, further comprising:
a receiver to receive the user preference information including the domain selection information set by a user using an apparatus other than the terminal, for storage in the storage unit.

17. A terminal for providing service continuity and selecting a domain for an outgoing call originating from the terminal in the service, the terminal comprising:
a storage unit to store operator policy information and user preference information, the user preference information including domain selection information specifying a user-preferred domain to be used when originating the outgoing call from the terminal, the operator policy information including domain selection information specifying a operator-preferred domain to be used when originating the outgoing call from the terminal;
a controller to perform a domain selection for the outgoing call based on either the user preference information or the operator policy information; and
a Device Management (DM) unit to receive the operator policy information for storage in the storage unit,
wherein the terminal supports voice call continuity (VCC) that is a home Internet Protocol multimedia subsystem (IMS) application capable of transporting voice calls between a circuit-switched (CS) domain and an IP multimedia subsystem (IMS) domain,
wherein the controller selects either the circuit switched (CS) domain or the IP multimedia subsystem (IMS) domain for the outgoing call based on the domain selection information of the operator policy information or the user preference information, and
wherein the controller selects either the circuit switched (CS) domain or the IP multimedia subsystem (IMS) domain for the outgoing call based on the domain selection information of the user preference information, if the user preference information has a higher priority than the operator policy information, or
wherein the controller selects either the circuit switched (CS) domain or the IP multimedia subsystem (IMS) domain for the outgoing call based on the domain selection information of the operator policy information, if the operator policy information has a higher priority than the user preference information.

18. The terminal of claim 17, wherein the storage unit receives, from a voice call continuity (VCC) application server, the operator policy information including the domain selection information.

19. The terminal of claim 17, wherein the controller transmits a query regarding a network's preference of a domain to a voice call continuity (VCC) application server, and receives the operator policy information including the domain selection information from the VCC application server for storage in the terminal.

* * * * *